US010634918B2

(12) United States Patent
Brusnitsyn (10) Patent No.: US 10,634,918 B2
(45) Date of Patent: Apr. 28, 2020

(54) INTERNAL EDGE VERIFICATION (71) Applicant: SEIKO EPSON CORPORATION, Tokyo (JP)

(72) Inventor: Mikhail Brusnitsyn, Toronto (CA)

(73) Assignee: SEIKO EPSON CORPORATION, Tokyo (JP)

( * ) Notice: Subject to any disclaimer, the term of this patent is extended or adjusted under 35 U.S.C. 154(b) by 9 days.

(21) Appl. No.: 16/123,372

(22) Filed: Sep. 6, 2018

(65) Prior Publication Data
US 2020/0081249 A1 Mar. 12, 2020

(51) Int. Cl.
G02B 27/01 (2006.01)
G06T 7/73 (2017.01)
G06T 7/20 (2017.01)
G06T 7/13 (2017.01)
G06T 19/00 (2011.01)

(52) U.S. Cl.
CPC ............ G02B 27/0172 (2013.01); G06T 7/13 (2017.01); G06T 7/20 (2013.01); G06T 7/75 (2017.01); G06T 19/006 (2013.01); G02B 2027/0138 (2013.01); G02B 2027/0178 (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| 6,116,640 | A | 9/2000 | Tanaka et al. |
| 7,889,193 | B2 | 2/2011 | Platonov et al. |
| 8,578,299 | B2 * | 11/2013 | Chen ...................... G06F 3/005 345/473 |
| 8,780,110 | B2 | 7/2014 | Ben Himane et al. |

(Continued)

FOREIGN PATENT DOCUMENTS

JP 2011-129082 A 6/2011
JP 2013-050947 A 3/2013

OTHER PUBLICATIONS

Oct. 3, 2019 Office Action issued in U.S. Appl. No. 15/951,840.
(Continued)

Primary Examiner — Todd Buttram
(74) Attorney, Agent, or Firm — Oliff PLC (57) ABSTRACT A method for one or more processors to implement includes acquiring a synthetic image of an object from a second orientation different from a first orientation, using a three-dimensional model. The method further includes identifying, in the synthetic image, second edge points that are located on an edge of the object that is not a perimeter. The method further includes identifying matched edge points, which are first edge points and second edge points at substantially a same location on the object. The method further includes storing the matched edged points in a memory that can be accessed by an object-tracking device, so that the object-tracking device can identify the object in a real environment by identifying the matched edge points in images of the object.

20 Claims, 8 Drawing Sheets

(56) References Cited

U.S. PATENT DOCUMENTS

| | | | |
|---|---|---|---|
| 9,002,098 B1 * | 4/2015 | Chelian | G06T 7/74 |
| | | | 382/153 |
| 9,111,347 B2 | 8/2015 | Ben Himane | |
| 9,330,491 B2 | 5/2016 | Wang et al. | |
| 9,875,427 B2 | 1/2018 | Medasani et al. | |
| 10,373,380 B2 * | 8/2019 | Kutliroff | G06T 19/006 |
| 2009/0096790 A1 | 4/2009 | Wiedemann et al. | |
| 2011/0002531 A1 | 1/2011 | Heisele et al. | |
| 2012/0120199 A1 | 5/2012 | Ben Himane | |
| 2012/0314096 A1 | 12/2012 | Kruglick | |
| 2013/0051626 A1 | 2/2013 | Abadpour et al. | |
| 2013/0218530 A1 | 8/2013 | Deichmann et al. | |
| 2014/0079314 A1 | 3/2014 | Yakubovich et al. | |
| 2014/0098100 A1 | 4/2014 | Dane et al. | |
| 2015/0154786 A1 | 6/2015 | Furukawa et al. | |
| 2015/0161457 A1 | 6/2015 | Hayakawa et al. | |
| 2017/0053447 A1 | 2/2017 | Chen et al. | |
| 2017/0214899 A1 | 7/2017 | Meier et al. | |
| 2018/0182071 A1 | 6/2018 | Ayari et al. | |
| 2018/0253593 A1 | 9/2018 | Hu et al. | |

OTHER PUBLICATIONS

Konishi et al; "Fast 6D Object Pose Estimation from a Monolcular Image using Hierarchical Pose Trees;" OMRON Corportaion; 2016; 1 page.

Peng; "Combine color and shape in real-time detection of textureless objects;" Computer Vision and Image Understanding; vol. 135; 2015; pp. 31-48.

U.S. Appl. No. 15/839,247, filed Dec. 12, 2017 in the name of Moravec et al.

U.S. Appl. No. 15/875,579, filed Jan. 19, 2018 in the name of Szeto et al.

U.S. Appl. No. 15/451,752, filed Mar. 7, 2017 in the name of Lam et al.

U.S. Appl. No. 15/951,840, filed Apr. 12, 2018 in the name of Ahmed et al.

U.S. Appl. No. 15/949,728, filed Apr. 10, 2018 in the name of Mukherjee et al.

Oct. 19, 2018 Office Action issued in U.S. Appl. No. 15/451,752.

Oct. 28, 2019 U.S. Office Action issued U.S. Appl. No. 15/451,752.

Apr. 19, 2019 Office Action issued in U.S. Appl. No. 15/875,579.

Apr. 15, 2019 Office Action issued in U.S. Appl. No. 15/451,752.

Jaramillo et al. "6-DoF Pose Localization in 3D Point-Cloud Dense Maps Using a Monocular Camera." Proceedings of ROBIO 2013—IEEE International Conference on Robotics and Biomimetics, Institute of Electrical and Electronics Engineers, Dec. 2013, pp. 1747-1752.

Jan. 13, 2020, Office Action issued U.S. Appl. No. 15/949,728.

Feb. 26, 2020 Notice of Allowance issued in U.S. Appl. No. 15/451,752.

Mar. 11, 2020 Office Action Issued in U.S. Appl. No. 15/951,840.

* cited by examiner

INTERNAL EDGE VERIFICATION

BACKGROUND

1. Technical Field

The disclosure relates generally to the field of object detection and pose estimation in image data streams, and more specifically to augmented reality system including low feature object detection and pose estimation in image data streams.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is important in many AR implementations. This means that a real-world object is "followed" by an artificial object, such as computer-graphics enhancements or an information bubble (as perceived by the user). In other words, if the real-world object moves or the user's view moves relative to the real-world object, the artificial object will remain in the same location relative to the real-world object and/or the content of the artificial object will be determined based on the movement and/or new location of the real-world object. Location tracking is also important in many AR implementations. This means that a virtual object will stay in one location in the scene, regardless of the movement of the user.

One platform for implementing AR is the smartphone or tablet. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement AR.

Another platform is the head mounted display (HMD) which can implement AR providing richer AR experience. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

3D pose estimation is an important technology with many applications, including the fields of AR, VR and robotics. In AR and VR, one problem is that of tracking the 3D pose of the object with respect to the camera so that various augmented or virtual reality elements can be anchored to the object. Many trackers require an initialization method to first start tracking and to re-start tracking in case of tracking loss. This requires estimating the pose of an object from an image without prior history, a technology sometimes referred to as object detection and pose estimation (ODPE).

SUMMARY

One problem that arises in object tracking is attempting to detect object poses for objects with a simple profile, such as symmetrical or roughly symmetrical objects. Without further information such as textures, it may be impossible to differentiate multiple potential poses from each other. Thus, it is difficult to use contour edges alone for pose estimation.

In order to overcome these difficulties, embodiments herein describe using internal edges, or edges that are not on a contour of the object, for detection. This allows for higher performance tracking because textures do not need to be used. It is also more accurate than tracking with only contours, because the internal edges may be uniquely positioned in different poses.

In order to achieve these benefits, embodiments of the disclosure include a method for one or more processors to implement. The method includes acquiring, from a camera, a first image frame of an object at a pose with respect to the camera. The method further includes generating a second image frame by rendering a three-dimensional model from a view consistent with the pose, the three-dimensional model corresponding to the object. The method further includes extracting first features of the object from the first image frame. The method further includes extracting second features of the three-dimensional model from the second image frame. The method further includes generating and storing, in a first memory area, first template data including coordinate points of first and/or second features that match each other, the first template data corresponding to the view. The method further includes generating a third image frame by rendering the three-dimensional model from a neighboring view of the view. The method further includes extracting third features of the three-dimensional model from the third image frame. The method further includes generating and storing, in a second memory area, second template data including coordinate points of the third features that are found to match coordinate points in the first template data, the second template data corresponding to the neighboring view. The method further includes outputting, for use by an object detection and pose estimation device, the second template data. In another embodiment, the first memory area and the second memory area may be the same memory area.

In some embodiments, the first features are internal edges that are other than a contour of the object in the first image frame. In some embodiments, the coordinate points of the first and second features include two-dimensional and three-dimensional points. In some embodiments, the neighboring view is within 10° of the view. In some embodiments, the method further includes: determining if an object size within the first image frame is below a threshold size, and when the object size is below the threshold size, increasing a resolution of the object in the second image frame. In some embodiments, the method further includes, before storing the second template data, removing a coordinate point in the second template data that is within a predetermined distance to another coordinate point in the second template data.

In order to achieve these benefits, embodiments of the disclosure further include a non-transitory computer readable medium that embodies instructions that cause on or more processors to perform a method. The method includes acquiring a real image taken by a camera of an object in an environment from a first orientation. The method further includes identifying, in the real image, first edge points on an edge of the object that is not a perimeter that borders the environment. The method further includes acquiring a synthetic image of the object from a second orientation different from the first orientation, using a three-dimensional model. The method further includes identifying, in the synthetic image, second edge points that are located on the edge of the object that is not the perimeter. The method further includes identifying matched edge points, which are first edge points and second edge points at substantially a same location on the object. The method further includes storing the matched edged points in a memory that can be accessed by an object-tracking device, so that the object-tracking device can identify the object in a real environment by identifying the matched edge points in images of the object.

In some embodiments, the method further includes: determining if an object size within the real image is below a threshold size; and when the object size is below the threshold size, increasing a resolution of the synthetic image of the object. In some embodiments, the method further includes, before storing the matched edge points, removing a matched edge point that is within a predetermined distance to another matched edge point. In some embodiments, first and second edge points are at substantially the same location when they are 8 pixels or less apart from each other in the synthetic image. In some embodiments, the method further includes, prior to acquiring the synthetic image of the object from the second orientation: acquiring a first synthetic image of the object from the first orientation, using the three-dimensional model; identifying, in the first synthetic image, synthetic edge points that are located on the edge of the object that is not the perimeter; identifying first matched edge points, which are first edge points and synthetic edge points at substantially a same location on the object; and using the first matched edge points as first edge points in the identifying of matched edge points. In some embodiments, the internal edge is an intersection of two surfaces that are not coplanar. In some embodiments, the first edge points include two-dimensional and three-dimensional points. In some embodiments, the first orientation is within 10° of the second orientation.

In order to achieve these benefits, embodiments of the disclosure further include a head mounted display device, including a camera that captures an image of an object in an environment from a first orientation. The head mounted display device further includes a display that displays a virtual image to a user wearing the head mounted display device. The head mounted display device further includes a memory that stores points along an internal edge of the object, the internal edge being not located on a perimeter of the object that borders the environment, the points having been obtained by identifying the internal edge on a three-dimensional model of the object at the first orientation, and comparing it to a same internal edge on a real image of the object from a second orientation different from the first orientation. The head mounted display device further includes a processor. The processor is configured to acquire the image, and estimate a pose of the object with respect to the camera based on the image. The processor is further configured to, using the estimated pose, estimate a subset of points along the internal edge that are visible in the image and locations of the subset of points in the image. The processor is further configured to map the subset of points onto the image at the locations, and compare an arrangement of the subset of points to corresponding object features in the image. The processor is further configured to, when the arrangement of the subset of points is sufficiently close to the corresponding object features, confirm the estimated pose. The processor is further configured to instruct the display to display a virtual image indicating the confirmed pose of the object.

In some embodiments, the internal edge is an intersection of two surfaces that are not coplanar. In some embodiments, the memory does not store a real image of the object at the first orientation to compare to the captured image. In some embodiments, the arrangement of the subset of points is sufficiently close to the corresponding object features when a sufficient percentage of the subset of points is within a distance of 8 pixels of the corresponding object features in the image. In some embodiments, the processor estimates the pose by matching a contour of the object with a contour stored in the memory at the estimated pose. In some embodiments, the processor is further configured to: when the arrangement of the subset of points is not sufficiently close to the corresponding object features, estimate a second pose of the object different from the estimated pose, and use the second estimated pose as the estimated pose. In some embodiments, the sufficient percentage is 50%.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
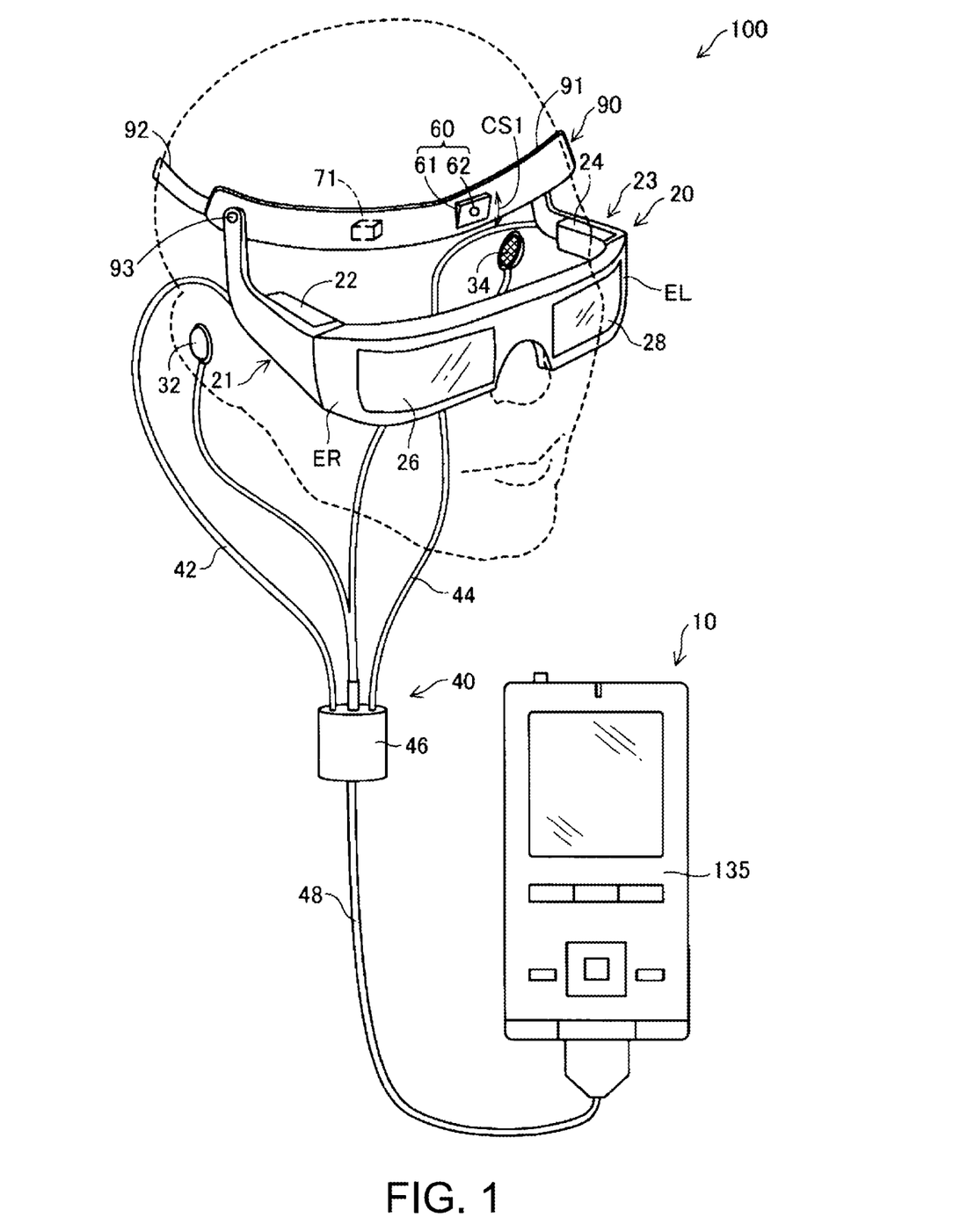
FIG. 1 is a diagram illustrating a schematic configuration of an example HMD.

FIG. 1 shows a schematic configuration of an HMD 100. The HMD 100 is a head mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
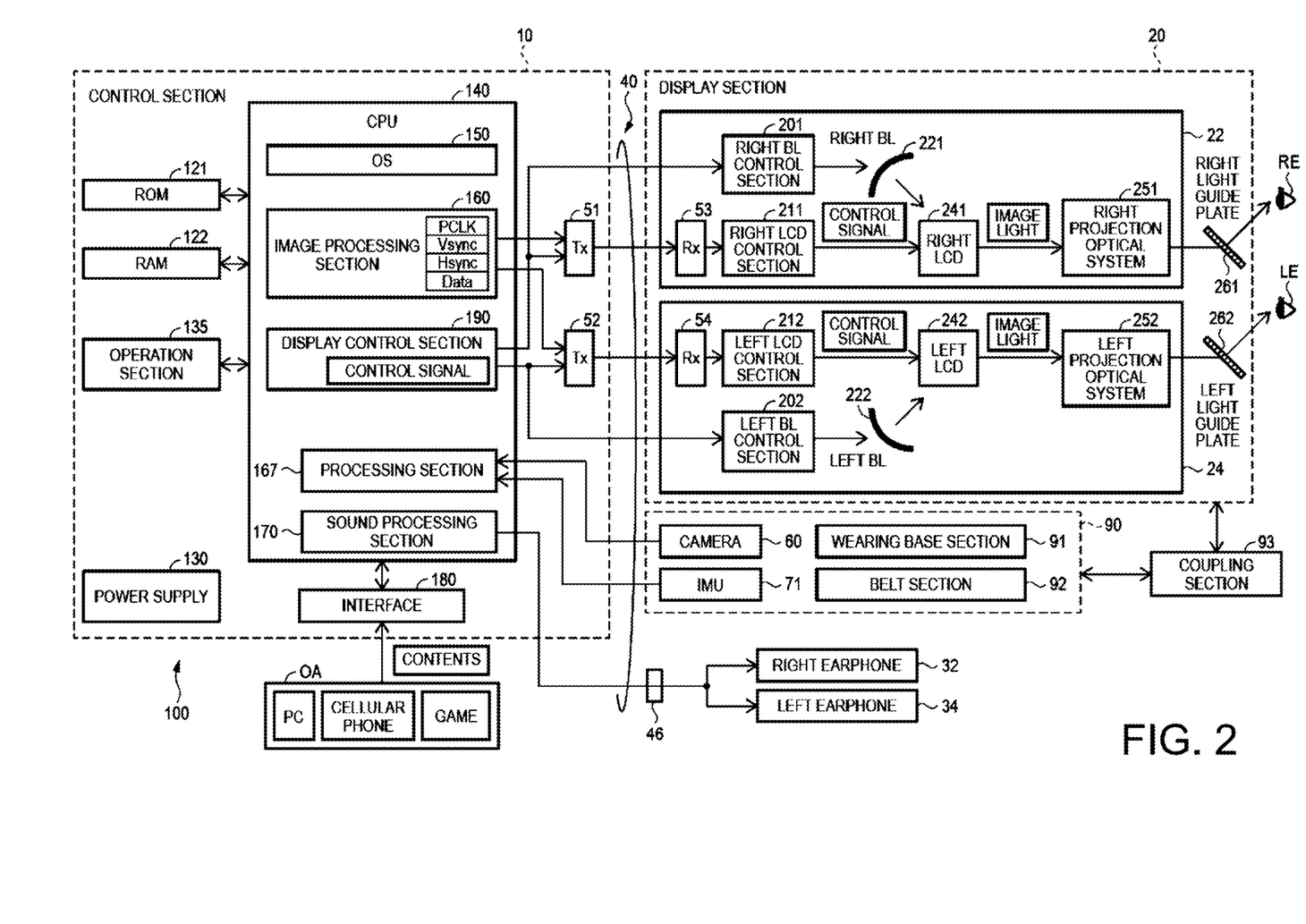
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter 51 (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a nomography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. However, the device to which the following disclosed software is applied may be an imaging device other than an HMD. For example, the device may be an imaging device that has no function of displaying an image. Alternatively, the device could be a smartphone or tablet.

Using the HMD, or another device having a camera and display such as a smartphone or tablet, object tracking can be achieved using an object detection and pose estimation (ODPE) process. Object tracking is used to implement many AR functions, such as dialogue boxes that follow real-world objects. For such functions, the location of the object relative to the camera/display should be known in real-time. In many instances, ODPE involves identifying an object using a CAD model of the object and images of the object obtained from an image stream of the camera. Once the object is detected, the relative position to the camera (or pose) is estimated, and object tracking is performed. With ODPE, the pose used for object tracking is typically a pose of the object with respect to the camera.

Figure 3A:
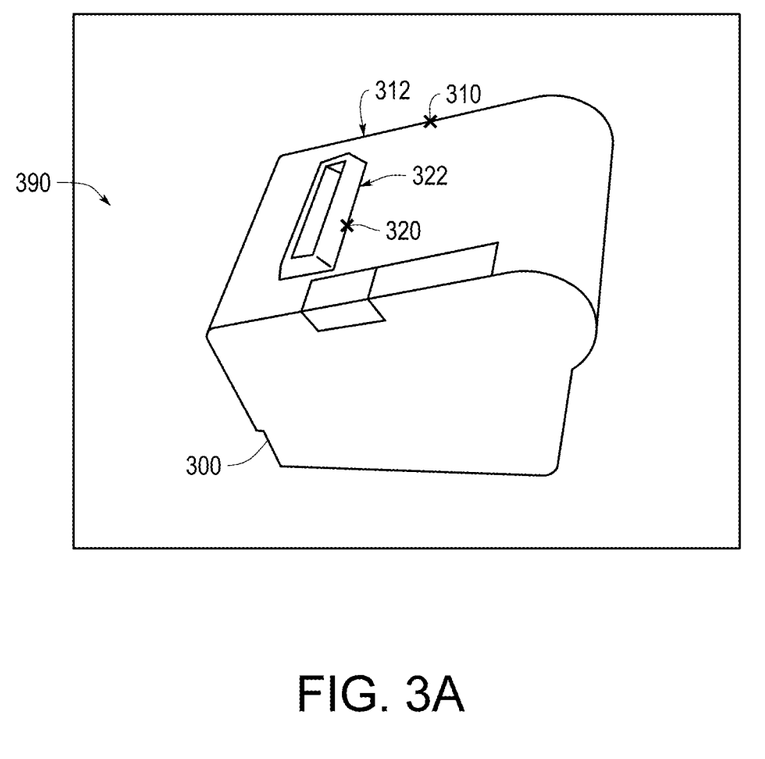
FIG. 3A is an image of an object in an environment according to one embodiment.

Methods according to this disclosure use internal object edges during verification of object pose candidates as a last step of low feature object detection and pose estimation (ODPE). FIG. 3A demonstrates an internal edge 322 on an object 300. As can be seen, internal edge 322 is an edge that is not on an outer contour 312 of object 300, and does not border a portion of environment 390 in the image. When tracking internal edges 322, internal edge points 320 along the internal edge are used by the software. Object 300 also includes outer edges 312, or contour lines, which can also be tracked using outer edge points 310. The software can detect and track the position of the object 300 relative to the camera using these points 310, 320 by determining the location of these points in an image of the object. Edges 312 and 322 can also be used for tracking, by calculating relative angles, orientations, and sizes of the edges 312, 322 in a captured image compared to training data. The location of the points (or relative inclinations of edges 312, 322) indicates the location and orientation of the object 300.

Internal edges 322 are used for tracking herein because relying on the external object contour 312 is not always possible, especially if the object 300 has a simple shape. For example, if an object 300 has a simple external shape, it could appear the same from several angles. As a result, the pose is difficult to ascertain with certainty based on the external edges 312 without more object information.

Figure 3B:
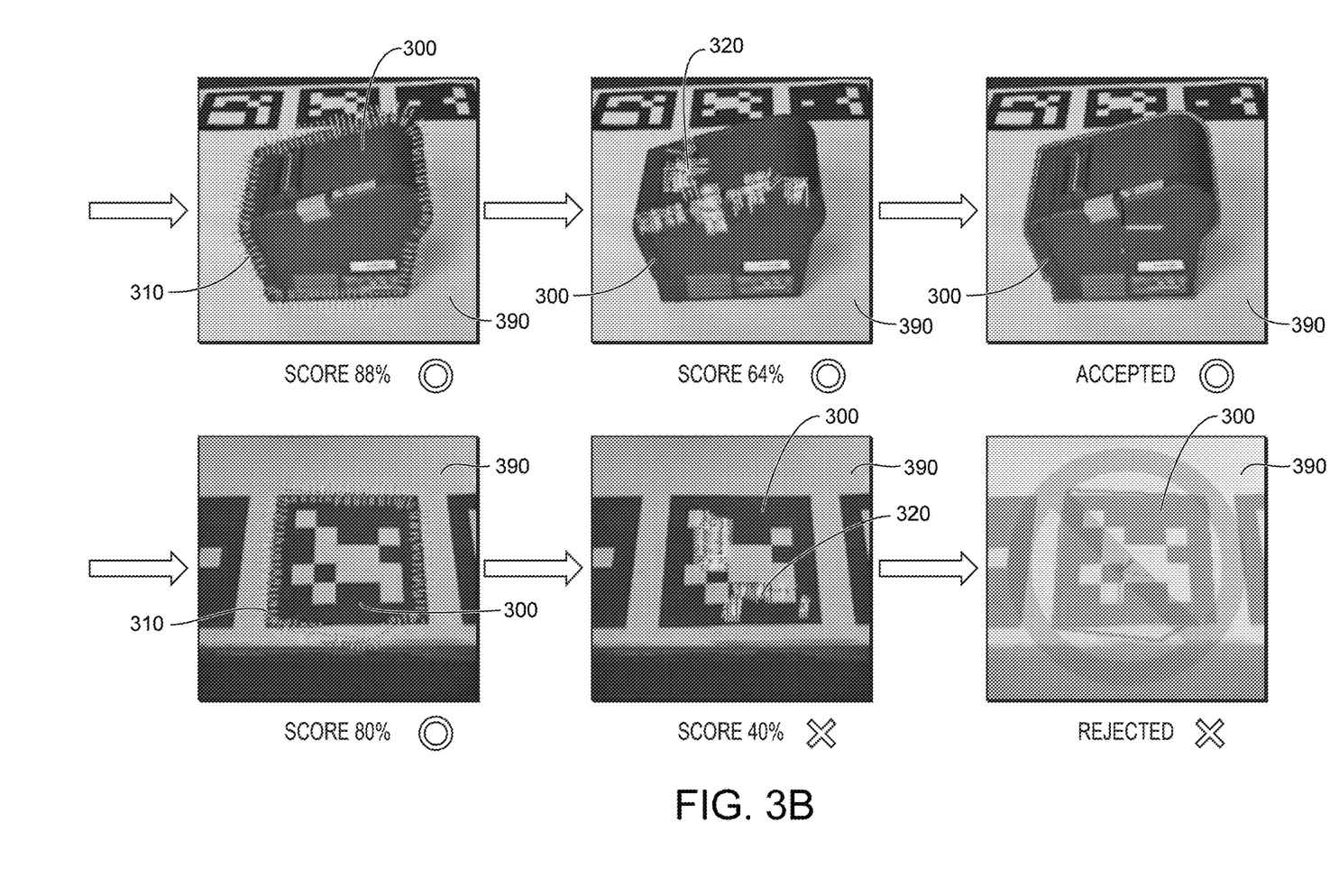
FIG. 3B is a flowchart of images showing a method according to one embodiment.

This phenomenon is demonstrated in FIG. 3B, which shows internal edge verification in action. In the upper left picture, the pose of object 300 is being estimated by using outer edge points 310 (or points along the contours). In this example, the score is 88%, meaning that 88% of the outer edge points 310 are within an acceptable threshold of their expected location for that object pose.

In the upper middle picture of FIG. 3B, internal edges 322 are verified for the estimated pose. In this embodiment, this is performed after the outer edge 312 verification of the upper left picture. In this example, the pose is also correct according to the internal edge 322 verification. In this example, the internal edge points 320 achieved a score of 64%, which is above the threshold for confirming the pose in this embodiment.

Accordingly, the pose is accepted as shown in the upper right drawing of FIG. 3B. Thus, the software confirms that its estimated pose of the object is correct, and proceeds accordingly (i.e. by performing detection and tracking based on the estimated pose).

The bottom three pictures in FIG. 3B show a scenario where internal edge tracking causes an estimated pose to be rejected. This case is noteworthy because it is these situations where the internal edge verification improves the accuracy of pose estimation and tracking.

In the lower left picture of FIG. 3B, outer edge tracking is performed. Because the object being tracked 300 has a simple (square) external shape, there appears to be a pose match that is later determined to be incorrect. Specifically, the outer edge points 310 achieve a score of 80%. Next, internal edge point 320 matching is performed.

As can be seen in the lower middle picture of FIG. 3B, the internal block pattern is misaligned. Thus, this pose is not correct, as shown by the low (40%) score of the internal edge point 320 matching, which is considered a failed match. In view of the failure to match the internal edge points 320 for the estimated pose, this estimated pose is rejected. At this stage, the software can try to estimate a different pose or take another action to continue to perform detection or tracking.

Figure 6:
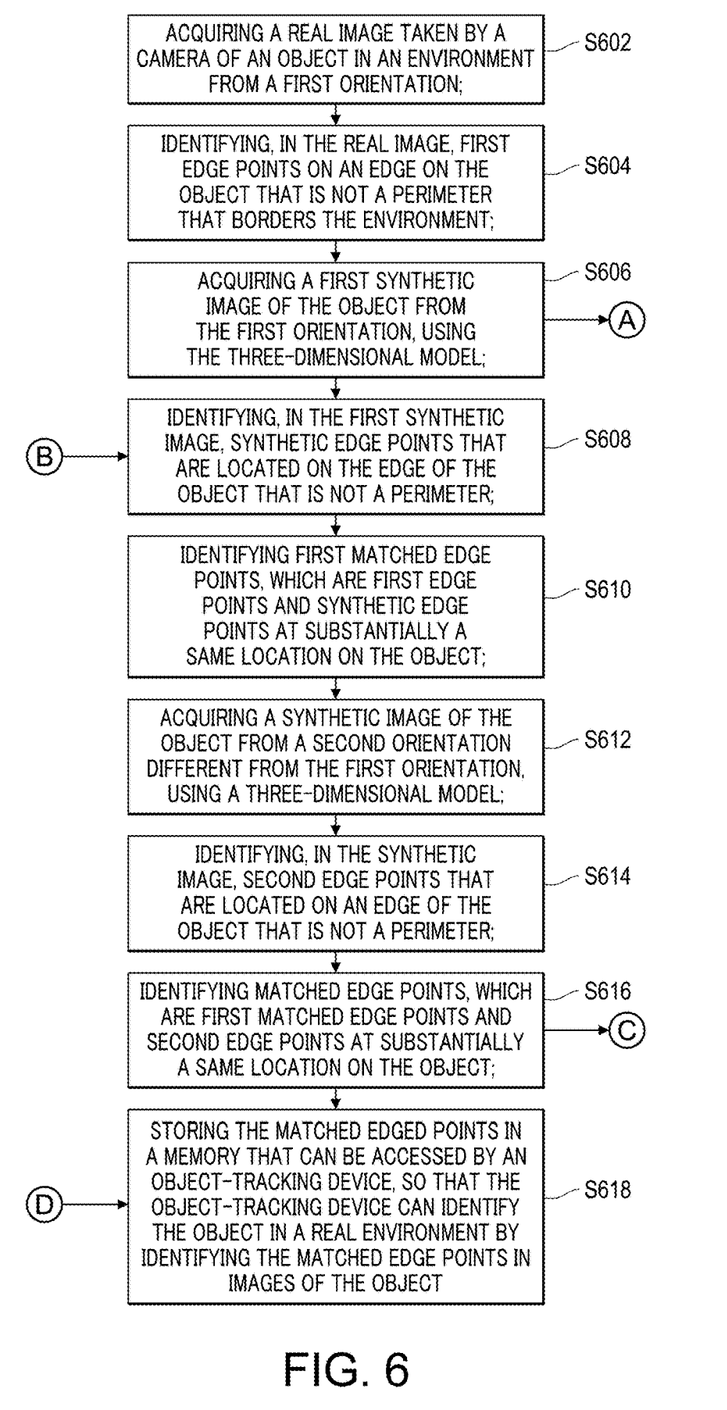
FIG. 6 is a flowchart of a method according to one embodiment.
Figure 7:
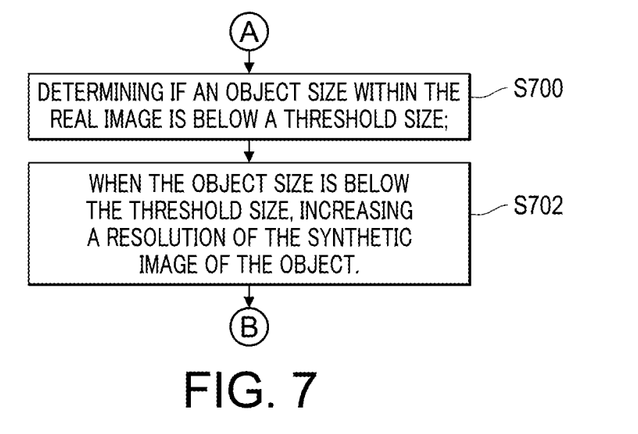
FIG. 7 is a flowchart of a method according to one embodiment.
Figure 8:
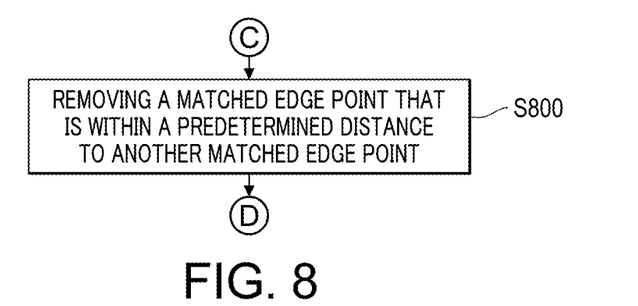
FIG. 8 is a flowchart of a method according to one embodiment.

A method according to several embodiments of obtaining and tracking these internal edge points 320 is shown in FIGS. 6-8. In order to perform internal edge tracking, internal edge points 320 should first be obtained. Internal edge points 320 for ODPE can be obtained by using real images 430 of the object 300 to train the software.

Accordingly, in some embodiments, the first step is acquiring a real image taken by a camera of an object in an environment from a first orientation (S602), and the next step is identifying, in the real image, first edge points on an edge on the object that is not a perimeter that borders the environment (S604). In such a procedure, the system detects edges 312, 322 in each real training image with, e.g., the Canny edge detector. Internal edges 322 are then separated from external edges 312 for use.

Figure 5A:
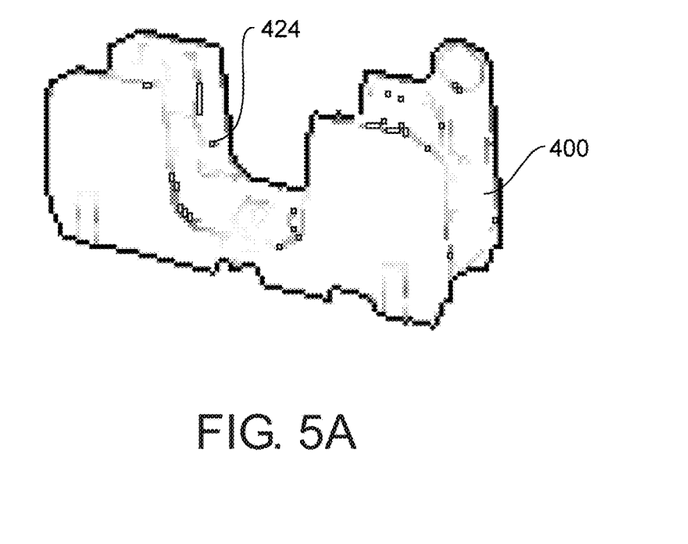
FIG. 5A is a CAD model of a tracked object according to one embodiment.
Figure 5B:
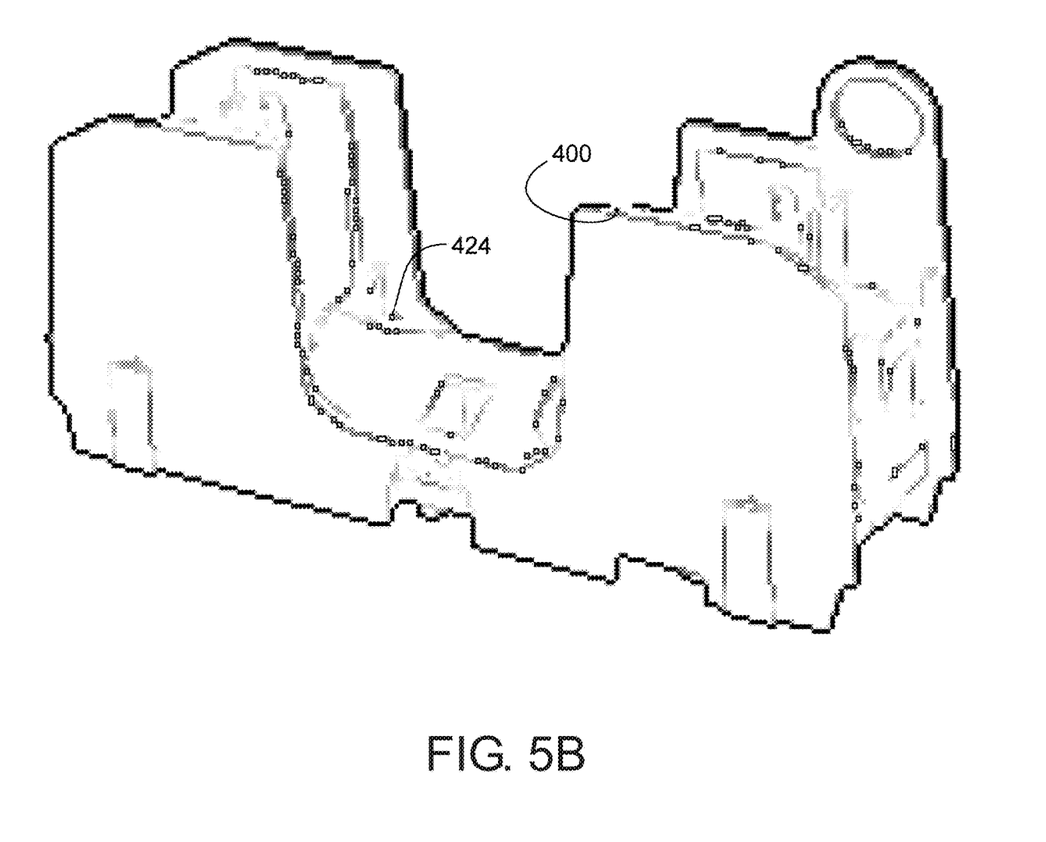
FIG. 5B is the CAD model of FIG. 5A rendered with double resolution.

Next, a first synthetic image (or synthetic view 434) of the object from the first orientation is acquired using the three-dimensional model (S606). In other words, the object CAD model 400 is rendered using the same pose as in the real image and synthetic edges are extracted. Intrinsics of the camera used to capture the real image may be used to simplify edge mapping between real and synthetic edges. However, when the object size in the image is small, the rendering resolution of the object CAD model 400 can be doubled to improve the rendering accuracy, as shown in FIGS. 5A and 5B. This procedure is also shown in FIG. 7, including determining if an object size within the real image is below a threshold size (S700), and when the object size is below the threshold size, increasing a resolution of the synthetic image of the object (S702).

The next step is identifying, in the first synthetic image, synthetic edge points that are located on the edge of the object that is not a perimeter (S608). In some embodiments, software is used to identify edges 312, 322 in an image of the object 300. This identifies all edges of the object 300, and thus outer edge points 310 are later filtered out from the results by the software.

The next step is to find correspondences between real and synthetic edges. In other words, first matched edge points, which are first edge points and synthetic edge points at substantially a same location on the object are identified (S610). In one embodiment, an eroded object mask is used to filter out outer contour points 310 and edges detected in the background 390 of the real image 430. In other words, when the silhouette of object 300 is known at the pose featured in the real image 430, outer edge points 310 and edges detected in environment 390 can be excluded by overlaying the inverted silhouette mask onto the image 430.

Direct point-to-point mapping of real to synthetic edges is difficult because the object pose in the training image is not always accurate. Therefore, a linear search is performed along the edge normal for each real edge point 420 inside the eroded object mask. In one embodiment, the search range is selected based on the pose alignment error of up to 4 pixels, which is ±4 pixels for single and ±8 pixels for double rendering resolution (as shown in FIG. 5B). A search is conducted for internal edge points 320 along the normal with the magnitude above the magnitude threshold (48) and the orientation similar to the real edge orientation (within ±10°). If an outer contour point 310 is found within the search range, the search is stopped and the outer contour point 310 is ignored as being too close to the object contour 312. If more than one point matches the search criteria, the closest one to the real edge point 420 is selected.

In the last step, the selected synthetic edge points 424 are projected back to the CAD model 400 and stored as 3D point coordinates in the model reference frame. In some embodiments, a second set of 3D points stores orientation of edge normals, so that the orientation of the edge is known.

Figure 4:
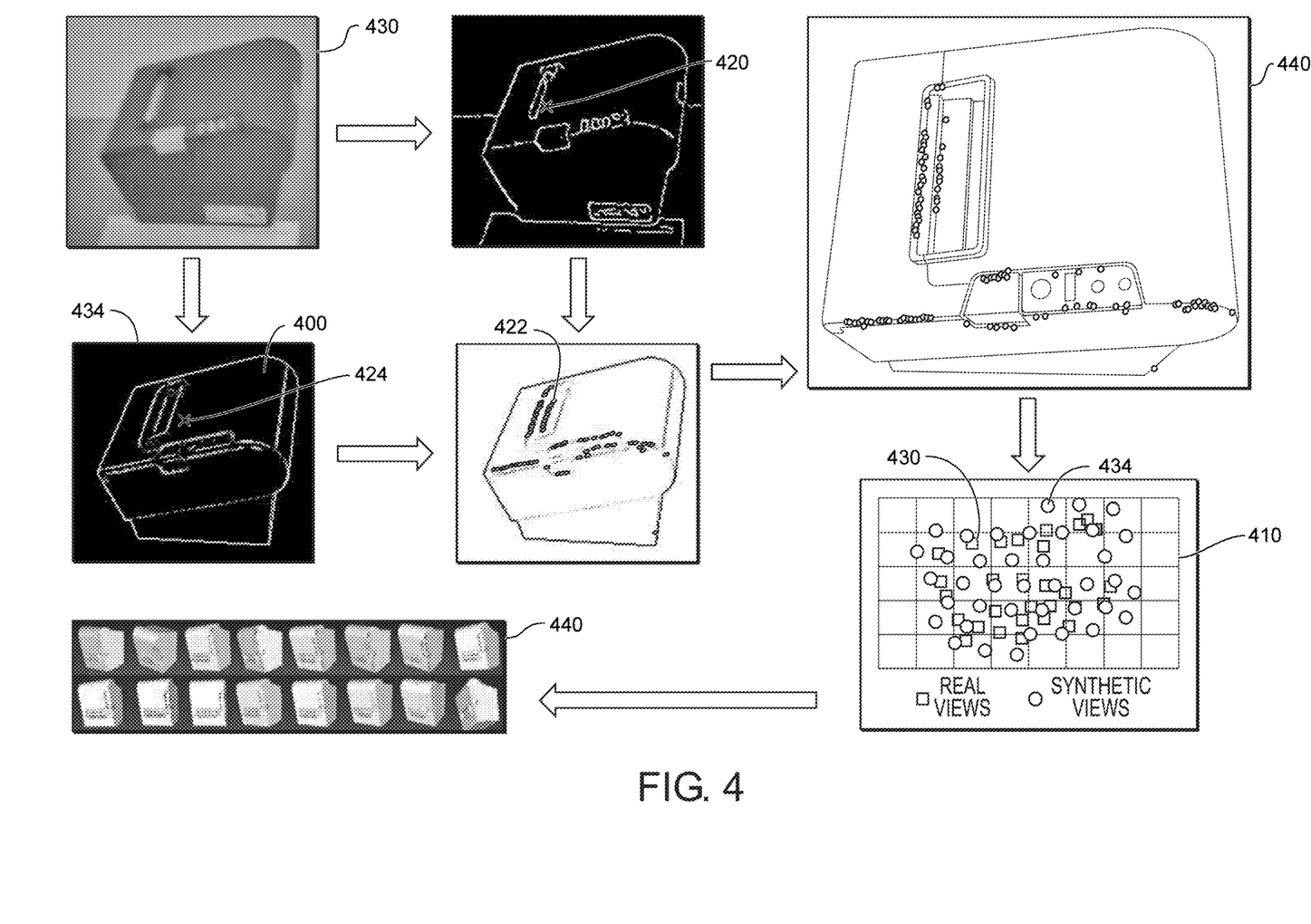
FIG. 4 is a flowchart of images showing a method according to one embodiment.

When the pose is estimated, different views on the view sphere are analyzed. The view sphere is a three-dimensional sphere of views of the object, which is used to track the object 300. A flattened version of the view sphere 410 is shown in FIG. 4. View sphere 410 includes real views (i.e. real images) 430 from which real training images of object 300 (and also synthetic images 434 in some embodiments) have been obtained, as indicated by the squares. Real views 430 are actual images of object 300 from the angle in question, from which internal edge points 320 can be obtained. View sphere 410 also includes synthetic views 434 from which only synthetic images of object 300 have been obtained, as indicated by circles. Synthetic views 434 are views of the object CAD model 400 from the angle in question, and can also be used to obtain internal edge points 320.

In the embodiment of FIG. 4, the view sphere 410 is almost uniformly sampled. In one embodiment, synthetic views 434 and real views 430 are obtained to an extent that the worst case angular difference to the closest view for any point on the sphere is less than 6° (3.5° on average). To achieve this, 482 views from around the view sphere 410 are obtained. The procedure described below is repeated for each sampled view that has at least one close neighbor among internal edge templates 440 generated for real training images, where 'close' means at most 10° away in terms of angular distance in this example.

As can be seen from view sphere 410, depending on the pose of object 300 at a given time during detection/tracking, there may not be a real view 430 available for use in identifying internal edge points 320. In other words, the memory does not store a real image of the object at the first orientation to compare to the captured image. To address this scenario, synthetic images 434 are used for these views, but are verified against neighboring real views 430 to determine which internal edge points are recognizable in a real image captured by the camera during detection/tracking.

Thus, the next step is acquiring a synthetic image 434 of the object from a second orientation different from the first orientation, using a three-dimensional model 400 (S612). Subsequently, second edge points that are located on an edge 322 of the object that is not a perimeter are identified in the synthetic image 434 (S614). In one embodiment, the synthetic object view 434 is rendered using a fixed size buffer (512 by 512 pixels) and CAD model edges and edge points 424 are extracted using the same technique as described above. The distance to the object 300 is set to the average distance of the real training views 430. All internal edge points 320 with a magnitude above the threshold are projected back to the CAD model 400 to obtain their 3D coordinates in the model space. As a result, a set of synthetic internal edge points 424 ($S_B$) with 2D (two-dimensional) image coordinates, gradient orientation, depth value and 3D (three-dimensional) model coordinates is obtained.

The next step is to select only those synthetic edge points 424 that correspond to real image inner edges 322. In other words, identifying matched edge points, which are first matched edge points and second edge points at substantially a same location on the object 300 (S616). This is difficult to do by direct mapping if the collection of real images 430 of the object 300 has a sparse and non-uniform distribution. Therefore, internal edge templates 440 previously generated for poses of the object 300 in real training images 430 are used to find edge correspondences indirectly.

Specifically in this embodiment, a subset of the previously generated internal edge templates within the angular distance of 10° with respect to the current densely sampled view is selected. The 3D points (or 3D model coordinates) included in the selected internal edge templates along with their orientation vectors are projected to the 2D image of the current densely sampled view, which results in a second set of internal edge points $S_B$ with 2D image coordinates, gradient orientation and their corresponding 3D model coordinates. Synthetic view edge points $S_A$(424) extracted from the densely sampled view are compared to edge points $S_B$ of the previously generated templates 440 within the angular distance of 10°. In this example, A synthetic edge point "A" from the set "$S_A$" is considered to match an internal edge point "B" from the set "$S_B$" if all of the following conditions are met: (i) the distance between the two points A and B in CAD model coordinates does not exceed 4 mm; (ii) the angle between the edge orientation at synthetic edge point A and edge orientation of internal edge point B projected to the 2D image of the sampled view is below 5'; (iii) the distance between the synthetic edge point A(424) and the internal edge point B projected to the 2D image of the sampled view does not exceed $T_1$ pixels; and (iv) the distance between the edge in the 2D image of the sampled view that corresponds to synthetic edge point A and the internal edge point B projected to the 2D image (point to line distance) does not exceed $T_2$ pixels. The values of $T_1$ and $T_2$ depend on the distance to the object 300 and the object size so that $T_1$ and $T_2$ correspond to 2 and 1 mm on the model respectively, in one embodiment. Once a synthetic edge point A is matched to an internal edge point B, it is considered a matched edge point 422 and stored in edge templates 440. In other words, the matched edged points are stored in a memory that can be accessed by an object-tracking device (e.g. HMD 100), so that the object-tracking device can identify the object 300 in a real environment 390 by identifying the matched edge points 422 in images of the object 300 (S618).

In the next step, the density of the successfully matched edge points 422 is reduced to limit the size of internal edge templates 440. In other words, removing a matched edge point 422 that is within a predetermined distance to another matched edge point 422 (S800). For each edge point adjacent edge points in a 3 by 3 pixel neighborhood are counted and edge points with the most neighbors are removed. The process is repeated until none of the matched edge points 422 has immediate neighbors.

Finally, an internal edge template 440 is created out of remaining successfully matched edge points 422. These templates 440 are created for multiple views of the object 300 around the view sphere 410. In some embodiments, the template 440 uses the same data structure as contour data for edge refinement, so that the same procedure can be used for both internal edge and external contour alignment verification (i.e. two 3D points per edge point—the point itself and a point in the direction of the edge tangent line).

Once templates 440 are generated, they are used for ODPE. This can be performed by a processor and camera on a device such as a head-mounted display 100, tablet, or smartphone. At runtime, after an object pose candidate has been verified using appearance-based and contour alignment verification (i.e. an estimated pose generated), internal edge templates 440 are used for internal edge verification as follows. All templates 440 within the angular distance of no more than 15° from the current pose are selected and sorted in ascending order of the angular distance, so that the closest template 440 is used first. In some embodiments, the software estimates edge points 320 that are visible from the estimated pose, based on templates 440. For example, if a surface of object 300 is visible from the estimated pose angle, internal edges 322 on that visible surface should also be visible. Points on those internal edges 322 would be used as a subset of points for mapping onto the test image.

Next, then the alignment of projected internal edge points 320 is checked with the edges detected in the test image, one training view at a time, until the total number of internal edge points 320 reaches or exceeds 50. In this embodiment, verification succeeds if at least 50% of projected edge points 320 are aligned with image edges with the accuracy of up to 15°. In other words, the inclination of an internal edge 322 from template 440 is calculated form the internal edge points 320 and their normals. A similar calculation is done for the corresponding internal edge 322 in the captured image. If the inclination angles of the two edges 322 are not within 15° of each other, the matching fails. If there are no internal edge templates 440 within the 15° range or the total number of available edge points is less than 50, the pose candidate is rejected. In other embodiments, instead of angular distance, pixel or absolute distance between the edge points 320 and corresponding image features is measured, and if the distance is above a threshold, the software considers the points to not be matched. Once the internal edges confirm the object pose, a final confirmation of the object pose is made. On the other hand, if the internal edges are not aligned properly, as shown in the bottom half of FIG. 3B, the pose is rejected and another estimated pose is checked for internal edge alignment. In some embodiments, the memory on the HMD does not store real edge points corresponding to the captured view, and the software relies on synthetic edge points that have been previously compared with real edge points.

The foregoing methods and software enable accurate object detection without necessarily relying on detailed object features such as a texture of the object. As a result, tracking can be performed with higher performance and frame rates, while remaining accurate. Moreover, incorrect pose estimations are avoided, particularly for objects with simple geometric shapes.

Based on the new object pose, a notification can be displayed to a user using a display. The displayed notification can take forms other than a displayed dialogue box, and these forms may be designed to increase the interactivity of the AR system. For example, if a real-world remote-control car is known to be moving (as determined by the methods described herein), virtual exhaust smoke or headlights can be displayed. On the other hand, if the car is known to not be moving, the smoke and lights are not displayed. This type of implementation could improve the entertainment value to the user. Alternatively, if the user is viewing real-world traffic, a warning tag could be selectively displayed on moving vehicles, so that safety is enhanced. Other forms of notifications indicating that a real-world object is moving or not moving can be displayed to the user in other embodiments.

Some embodiments provide a non-transitory storage medium (e.g. ROM 121, RAM 122) containing program instructions that, when executed by a computer processor (e.g. CPU 140 or processing section 167), perform the methods described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for one or more processors to implement, comprising:
   acquiring, from a camera, a first image frame of an object at a pose with respect to the camera;
   generating a second image frame by rendering a three-dimensional model from a view consistent with the pose, the three-dimensional model corresponding to the object;
   extracting first features of the object from the first image frame;
   extracting second features of the three-dimensional model from the second image frame;
   generating and storing, in a first memory area, first template data including coordinate points of first and/or second features that match each other, the first template data corresponding to the view;
   generating a third image frame by rendering the three-dimensional model from a neighboring view of the view;
   extracting third features of the three-dimensional model from the third image frame;
   generating and storing, in a second memory area, second template data including coordinate points of the third features that are found to match coordinate points in the first template data, the second template data corresponding to the neighboring view; and
   outputting, for use by an object detection and pose estimation device, the second template data.

2. The method according to claim 1, wherein the first features are internal edges that are other than a contour of the object in the first image frame.

3. The method according to claim 1, wherein the coordinate points of the first and second features include two-dimensional and three-dimensional points.

4. The method according to claim 1, wherein the neighboring view is within 10° of the view.

5. The method according to claim 1, further comprising:
   determining if an object size within the first image frame is below a threshold size; and
   when the object size is below the threshold size, increasing a resolution of the object in the second image frame.

6. The method according to claim 1, further comprising:
   before storing the second template data, removing a coordinate point in the second template data that is within a predetermined distance to another coordinate point in the second template data.

7. A non-transitory computer readable medium that embodies instructions that cause on or more processors to perform a method comprising:
   acquiring a real image taken by a camera of an object in an environment from a first orientation;
   identifying, in the real image, first edge points on an edge of the object that is not a perimeter that borders the environment;
   acquiring a synthetic image of the object from a second orientation different from the first orientation, using a three-dimensional model;
   identifying, in the synthetic image, second edge points that are located on the edge of the object that is not the perimeter;
   identifying matched edge points, which are first edge points and second edge points at substantially a same location on the object; and
   storing the matched edged points in a memory that can be accessed by an object-tracking device, so that the object-tracking device can identify the object in a real environment by identifying the matched edge points in images of the object.

8. The non-transitory computer readable medium of claim 7, wherein the method further comprises:

determining if an object size within the real image is below a threshold size; and when the object size is below the threshold size, increasing a resolution of the synthetic image of the object.

9. The non-transitory computer readable medium of claim 7, wherein the method further comprises:

before storing the matched edge points, removing a matched edge point that is within a predetermined distance to another matched edge point.

10. The non-transitory computer readable medium of claim 7, wherein first and second edge points are at substantially the same location when they are 8 pixels or less apart from each other in the synthetic image.

11. The non-transitory computer readable medium of claim 7, wherein the method further comprises, prior to acquiring the synthetic image of the object from the second orientation:

acquiring a first synthetic image of the object from the first orientation, using the three-dimensional model;

identifying, in the first synthetic image, synthetic edge points that are located on the edge of the object that is not the perimeter;

identifying first matched edge points, which are first edge points and synthetic edge points at substantially a same location on the object; and using the first matched edge points as first edge points in the identifying of matched edge points.

12. The non-transitory computer readable medium of claim 7, wherein the internal edge is an intersection of two surfaces that are not coplanar.

13. The non-transitory computer readable medium of claim 7, wherein the first edge points include two-dimensional and three-dimensional points.

14. The non-transitory computer readable medium of claim 11, wherein the first orientation is within 10° of the second orientation.

15. A head mounted display device, comprising:

a camera that captures an image of an object in an environment from a first orientation;

a display that displays a virtual image to a user wearing the head mounted display device;

a memory that stores points along an internal edge of the object, the internal edge being not located on a perimeter of the object that borders the environment, the points having been obtained by identifying the internal edge on a three-dimensional model of the object at the first orientation, and comparing it to a same internal edge on a real image of the object from a second orientation different from the first orientation; and a processor configured to:

acquire the image;

estimate a pose of the object with respect to the camera based on the image;

using the estimated pose, estimate a subset of points along the internal edge that are visible in the image and locations of the subset of points in the image;

map the subset of points onto the image at the locations;

compare an arrangement of the subset of points to corresponding object features in the image;

when the arrangement of the subset of points is sufficiently close to the corresponding object features, confirm the estimated pose; and instruct the display to display a virtual image indicating the confirmed pose of the object.

16. The head mounted display device of claim 15, wherein the internal edge is an intersection of two surfaces that are not coplanar.

17. The head mounted display device of claim 15, wherein the memory does not store a real image of the object at the first orientation to compare to the captured image.

18. The head mounted display device of claim 15, wherein the arrangement of the subset of points is sufficiently close to the corresponding object features when a sufficient percentage of the subset of points is within a distance of 8 pixels of the corresponding object features in the image.

19. The head mounted display device of claim 15, wherein the processor estimates the pose by matching a contour of the object with a contour stored in the memory at the estimated pose.

20. The head mounted display device of claim 15, wherein the processor is further configured to:

when the arrangement of the subset of points is not sufficiently close to the corresponding object features, estimate a second pose of the object different from the estimated pose, and use the second estimated pose as the estimated pose.

* * * * *